United States Patent
Perry et al.

Patent Number: 6,150,630
Date of Patent: Nov. 21, 2000

[54] LASER MACHINING OF EXPLOSIVES

[75] Inventors: Michael D. Perry, Livermore; Brent C. Stuart, Fremont; Paul S. Banks; Booth R. Myers, both of Livermore; Joseph A. Sefcik, Tracy, all of Calif.

[73] Assignee: The Regents of the University of California, Oakland, Calif.

[21] Appl. No.: 09/062,078

[22] Filed: Apr. 17, 1998

Related U.S. Application Data

[63] Continuation-in-part of application No. 08/859,020, May 20, 1997, which is a continuation-in-part of application No. 08/584,522, Jan. 11, 1996, Pat. No. 5,720,894.

[51] Int. Cl.$^7$ .................................................. B23K 26/00
[52] U.S. Cl. .............................. 219/121.68; 219/121.69; 219/121.67
[58] Field of Search ........................ 219/121.68, 121.69, 219/121.6, 121.61, 121.67, 121.78, 121.79

[56] References Cited

U.S. PATENT DOCUMENTS

| | | | |
|---|---|---|---|
| 4,826,785 | 5/1989 | McClure et al. | 437/174 |
| 5,656,186 | 8/1997 | Mourou et al. | 219/121.69 |
| 5,683,366 | 11/1997 | Eggers et al. | 604/114 |

*Primary Examiner*—Patrick Ryan
*Assistant Examiner*—M. Alexandra Elve
*Attorney, Agent, or Firm*—John P. Wooldridge; Alan H. Thompson

[57] ABSTRACT

The invention consists of a method for machining (cutting, drilling, sculpting) of explosives (e.g., TNT, TATB, PETN, RDX, etc.). By using pulses of a duration in the range of 5 femtoseconds to 50 picoseconds, extremely precise and rapid machining can be achieved with essentially no heat or shock affected zone. In this method, material is removed by a nonthermal mechanism. A combination of multiphoton and collisional ionization creates a critical density plasma in a time scale much shorter than electron kinetic energy is transferred to the lattice. The resulting plasma is far from thermal equilibrium. The material is in essence converted from its initial solid-state directly into a fully ionized plasma on a time scale too short for thermal equilibrium to be established with the lattice. As a result, there is negligible heat conduction beyond the region removed resulting in negligible thermal stress or shock to the material beyond a few microns from the laser machined surface. Hydrodynamic expansion of the plasma eliminates the need for any ancillary techniques to remove material and produces extremely high quality machined surfaces. There is no detonation or deflagration of the explosive in the process and the material which is removed is rendered inert.

9 Claims, 4 Drawing Sheets

LASER MACHINING OF EXPLOSIVES

This is a Continuation-In-Part of U.S. patent application Ser. No. 08/859,020 filed May 20, 1997, titled "Ultrashort Pulse Laser Machining of Metals and Alloys," which is a Continuation-In-Part of Ser. No. 08/584,522 filed Jan. 11, 1986, now U.S. Pat. No. 5,720,894 titled "Ultrashort Pulse High Repetition Rate Laser System for Biological Tissue Processing."

The United States Government has rights in this invention pursuant to Contract No. W-7405-ENG-48 between the United States Department of Energy and the University of California for the operation of Lawrence Livermore National Laboratory.

BACKGROUND OF THE INVENTION

1. Field of the Invention

The present invention relates to methods of machining explosives, and more specifically, it relates to the use of ultrashort laser pulses for machining explosives.

2. Description of Related Art

Explosives are typically cast into the shape of interest since post machining involves the risk of detonation and/or deflagration and the material is often too soft to be machined. Laser machining (cutting, drilling and sculpting) of high explosives has been attempted several times in the past with a variety of laser sources: Nd:YAG, $CO_2$, Excimer, Argon-ion, etc. Other than a few studies with the excimer source, all of these approaches were based on localized thermal processing where the purpose of the laser was simply to provide a well localized source of heat to melt or vaporize the material of interest. These approaches met with very limited success since the high temperature associated with the process often resulted in deflagration or worse, detonation of the explosive. A graphical representation of the approximate regimes of laser interaction with explosives is shown in FIG. 1. (On the other hand, the use of these conventional laser sources as a safe means of detonation is attracting increased popularity). Provided in Table I are the ignition temperatures of common explosives (from Ref. 7). Note that even moderate temperature rise of 150–300 degrees (Celsius) above room temperature is enough to ignite most explosives.

TABLE I

Ignition Temperatures (° C.) of selected explosives

| Tetrazene | 160 | RDX | 213 |
| --- | --- | --- | --- |
| Tetryl | 180 | TNT | 240 |
| Nitrocellulose | 187 | Lead Styphnate | 250 |
| Nitroglycerine | 188 | Lead Azide | 350 |
| PETN | 205 | TATB | 359 |

The basic interaction in localized thermal processing as is achieved with electron beam or current state of the art lasers is the deposition of energy from the incident beam in the material of interest in the form of heat (lattice vibrations). Absorption of beam energy may differ strongly between different explosives (TATB, TNT, PETN, Composition B, PBX, RDX) dependent upon the optical and thermomechanical properties of the material. The laser energy that is absorbed results in a temperature increase at and near the absorption site. As the temperature increases to the melting or boiling point, material is removed by conventional melting or vaporization. Depending on the pulse duration of the laser, the temperature rise in the irradiated zone may be very fast resulting in thermal ablation and shock. The irradiated zone may be vaporized or simply ablate off due to the fact that the local thermal stress has become larger than the yield strength of the material (thermal shock). In all these cases, where material is removed via a thermal mechanism there is an impact on the material surrounding the site where material has been removed. The surrounding material will have experienced a large temperature excursion or shock often resulting in initiation of a chemical reaction and deflagration.

Another limitation of conventional laser or electron beam (or any thermal based process) in machining high explosives is the vapor produced. This vapor produced by the rapid heating of most common high explosives is extremely toxic and corrosive.

SUMMARY OF THE INVENTION

It is an object of the present invention to provide a method for laser cutting/machining of explosives (e.g., TNT, TATB, PETN, RDX, etc.) which achieves high machining speed with extreme precision, no toxic vapor and no deflagration.

The present invention uses very short (5 Femtosecond to approximately 50 to 100 picoseconds) laser pulses delivered at high repetition rate (0.01 to over 100 kHz), with wavelengths that can range from 0.2 to 12 microns. Very small amounts of material (0.01–1 micron) can be removed per laser pulse with extremely small transport of energy either by shock or thermal conduction away from the volume of interest. This offers extremely high precision machining with no heat or shock effected zone. The lack of significant energy deposition beyond the volume of interest achieved by using these ultrashort pulses enables the use of high repetition (0.01–100 kHz) lasers without the need for external cooling of the part being machined. Even though only a very small depth of material is removed per pulse, the high repetition rate enables extremely high cutting/drilling rates (on the order of 1 mm depth per second).

Cut quality and cut efficiency with these ultrashort pulses can be significantly higher than that achievable for conventional longer pulse lasers. This follows from two critical features: 1) there is little loss of energy away from the region of interest since thermal conduction during the pulse is negligible and 2) there is no vaporization or transport of material during the pulse. The second of these features may require additional explanation. During the pulse, there is insufficient time for hydrodynamic expansion of the vaporized material. As a result, the laser pulse encounters the solid surface for the duration of the pulse, depositing energy directly into the solid and not into a vapor plume. After the pulse is over, a depth of approximately 0.5 microns leaves the surface with an expansion velocity determined by the initial temperature. Typical temperatures in the expanding plasma are between 0.25 and 100 eV and are determined by the product of the incident laser irradiance, $I(W/cm^2)$ and the square of the laser wavelength, $\lambda^2(\mu m)$. The high plasma temperature insures that the vaporized material will be completely removed from the kerf without redeposition on the walls. This material is removed before the arrival of the next laser pulse 0.01 to 100 milliseconds later. For example, an expanding vapor with even a low expansion velocity of $10^5$ cm/sec will be 1 meter away from the surface before the arrival of the next pulse if operating at a 1 kilohertz repetition rate. With conventional nanosecond or microsecond lasers, the vapor will evolve during the laser pulse. This reduces the coupling of the laser light to the solid surface since the incident laser light will be scattered and absorbed by the vapor. This problem is completely overcome by the use of the very short pulses of the present invention.

Additionally, the plasma that is produced is fully ionized. There are no molecular species in the initial plasma. The explosive material has been reduced to its atomic constituents: carbon, hydrogen, nitrogen, oxygen, etc. in the machining process of the present invention. As the plasma expands and cools, molecular combinations of these species may form. However, these molecules will be determined by the thermodynamics and kinetics of the plasma plume and not by the initial explosive material. These molecular species will have little relevance to the often hazardous vapor associated with processing high explosives.

By using pulses of a duration in the range of 5 femtoseconds to 50 picoseconds, extremely precise and rapid machining can be achieved with essentially no heat or shock affected zone. In this method, material is removed by a nonthermal mechanism. A combination of multiphoton and collisional ionization creates a critical density plasma in a time scale much shorter than electron kinetic energy is transferred to the lattice. The resulting plasma is far from thermal equilibrium. The material is in essence converted from its initial solid-state directly into a fully ionized plasma on a time scale too short for thermal equilibrium to be established with the lattice. As a result, there is negligible heat conduction beyond the region removed resulting in negligible thermal stress or shock to the material beyond approximately 1 micron from the laser machined surface. The transition to this nonthermal regime depends on the time scale for electrons to transfer their kinetic energy to the lattice and the multiphoton absorption probability of the explosive. This time scale varies slightly from explosive to explosive but is typically in the range of 1–20 picoseconds. The well characterized case of Silicon oxide (a dielectric surrogate) is shown in FIG. 2 (also see U.S. Pat. No. 5,720,894 and B. C. Stuart, et al, "Nanosecond to femtosecond laser induced breakdown in dielectrics," Physical Review B, 53, 1749 (1996). The transition to the nonthermal regime is indicated by the departure from the square root dependence of the damage threshold on laser pulse duration ($\tau^{1/2}$ dependence) which can be seen to occur around 10 picoseconds. Hydrodynamic expansion of the plasma away from the laser irradiated surface eliminates the need for any ancillary techniques to remove material and produces a precision machined surface. There is no detonation or deflagration of the explosive in the process and the material which is removed is rendered completely inert. Since there is negligible heating beyond the depth of material removed, the composition of the remaining material is unaffected by the laser machining process.

In addition to machining high explosives directly, the present invention enables simple disassembly of munitions (chemical, biological and conventional) without detonation or deflagration of the high explosive. The invention is usable in any machining operation involving high explosives or other chemical agents which are sensitive to heat or shock. This includes machining (cutting, drilling, sculpting) of the explosive itself or devices which contain explosive components. An example of the later would be disassembly of chemical, biological or conventional munitions. The applications described above are of commercial as well as government use.

DETAILED DESCRIPTION OF THE INVENTION

The invention covers a method of machining (cutting, drilling or sculpting) explosives by focusing a laser pulse with a duration of between 5 femtoseconds to as long as 100 picoseconds onto the surface of the material of interest in such a manner as to produce an ionized plasma on the surface while all material to a depth beyond a few microns from the interaction point remains below the melting point and is substantially unaffected by removal of the ablated material. Any laser system capable of producing a focused irradiance greater than $10^{12}$ W/cm$^2$ in a duration less than approximately 100 picoseconds can be used in the method. Any wavelength laser source can be used provided the beam is focused to achieve a peak irradiance (Watts/cm$^2$) high enough to produce an ionized plasma in vacuum.

The laser system used in the reduction to practice of the present invention produces a pulsed output beam having a selectively variable pulse duration from about 30 femtoseconds to over 100 picoseconds at a variable pulse repetition rate from 1 Hertz to over 10 kilohertz. The energy per pulse obtainable from the laser system is variable from 1 microjoule to over 5 millijoules deliverable in a beam having a spot size variable from about 10 microns to over 1 centimeter. These parameters have been shown to be particularly effective in ablating all types of explosives.

Figure 2:
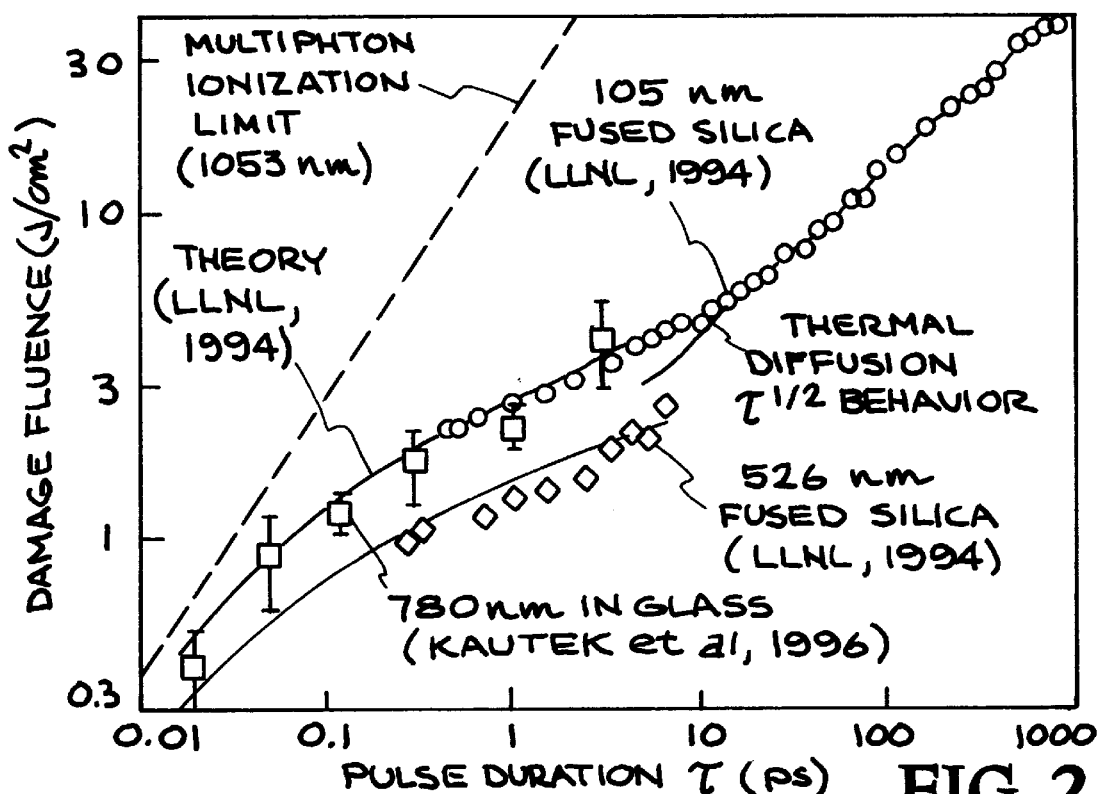
FIG. 2 shows the damage threshold of fused silica as a function of laser pulse duration.
Figure 1:
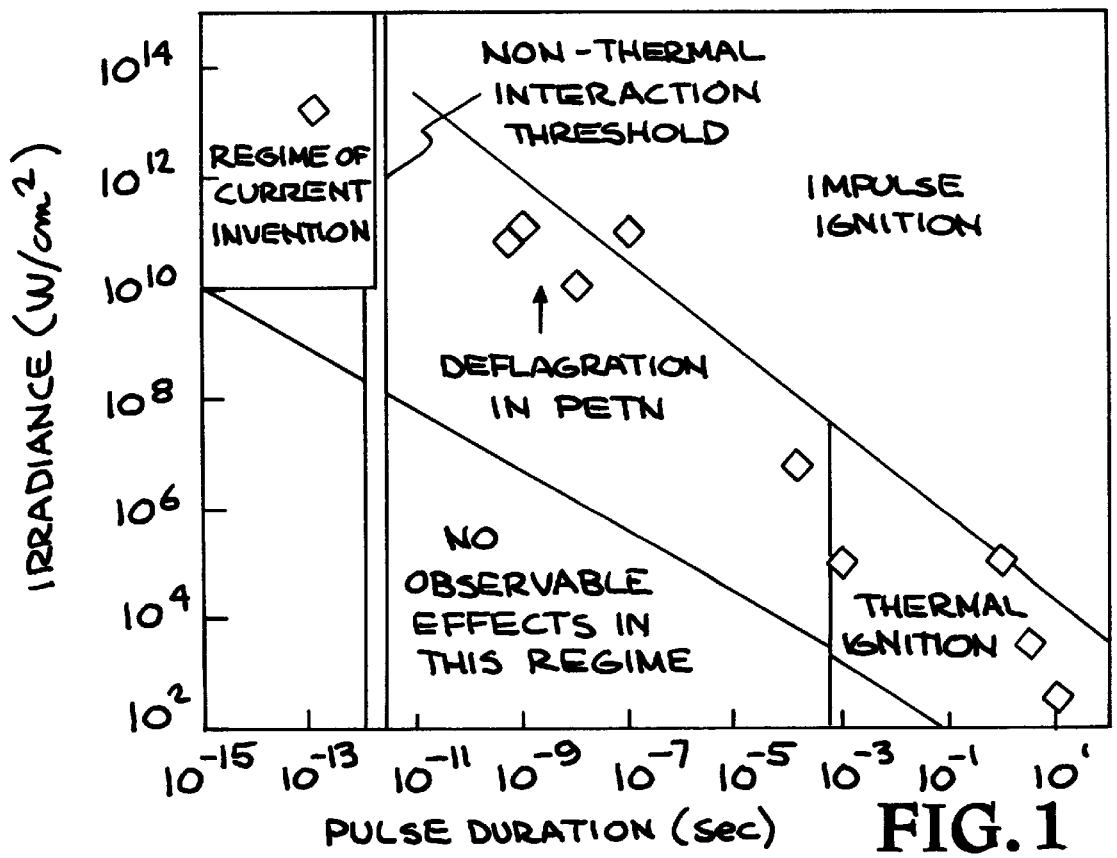
FIG. 1 shows the approximate regimes of laser interaction with high explosives.
Figure 3:
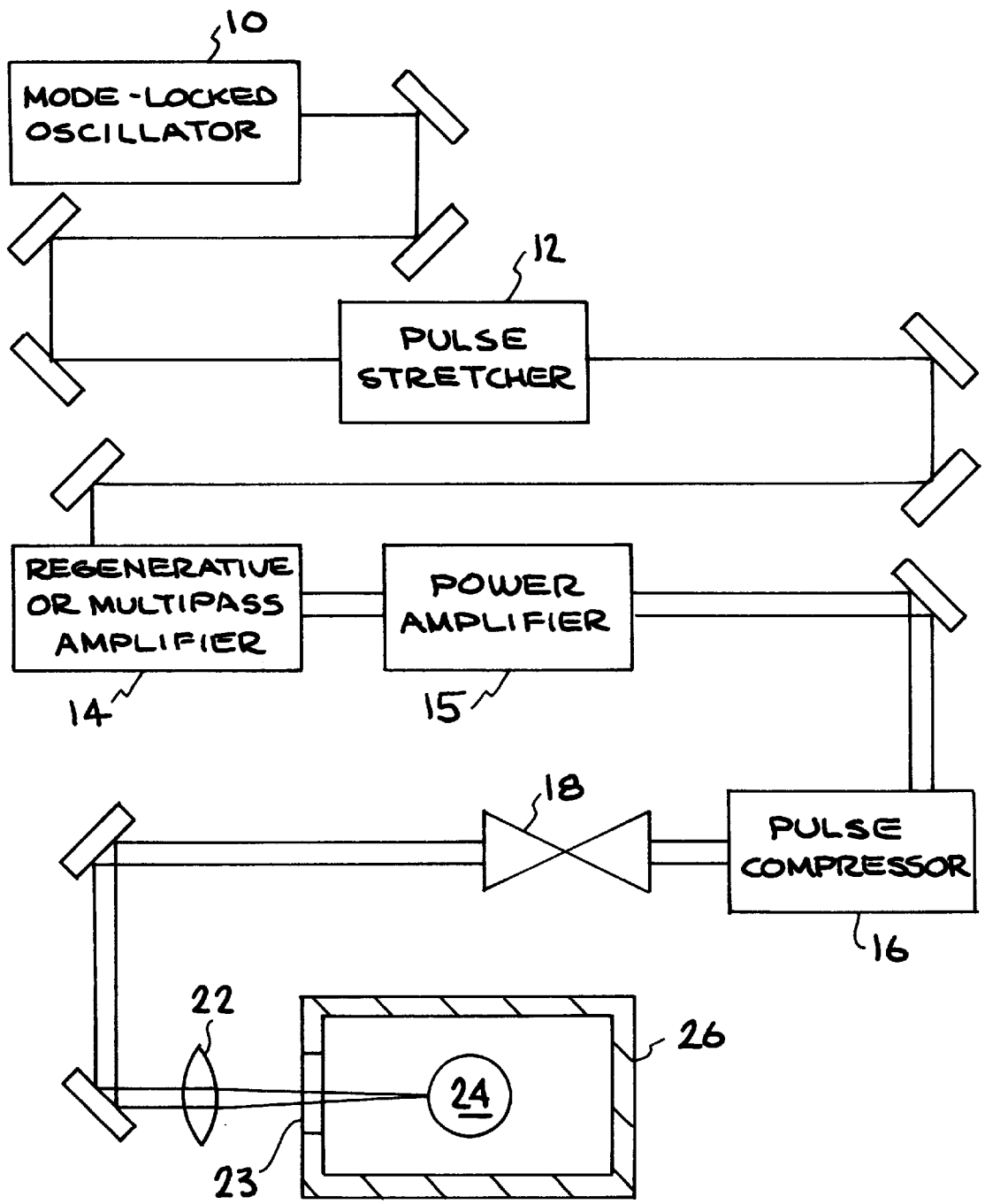
FIG. 3 is a block diagram of an embodiment of the present invention used to machine explosives.

Although, as will be described in greater detail below, any type of laser system, capable of operating within the parameters described above, can be employed in practice of the invention, the laser system as shown in FIG. 3 preferably begins with a mode-locked oscillator 10 producing pulses of either the same or shorter duration than the final desired pulse duration. Commercially available oscillators producing 50–100 femtosecond pulses and custom built oscillators producing 20–200 femtosecond pulses have been used. Both oscillators utilize the Kerr effect for mode-locking. Oscillators employing Titanium-doped sapphire and Chromium-doped lithium strontium aluminum fluoride (Cr:LiSrAlF$_6$) as the laser material have been used in the reduction to practice of the present invention. However, any laser material and mode locking mechanism capable of producing pulses of the desired duration can be employed. The pulses produced from these oscillators are very low in energy, on the order of 1 nanojoule. These low energy pulses are stretched by pulse stretcher 12 to a pulse duration greater than approximately 100 picoseconds prior to amplification (a stretched pulse duration greater than approximately 200 picoseconds is preferred).

Pulse stretching prior to amplification is necessary to avoid degradation of the spatial beam quality by selffocusing and phase modulation in the amplifier material. These effects arise from the intensity dependent component, $I(r,t)$, of the refractive index, $n(r,t)=n_o+\gamma I(r,t)$, where $\gamma=4\pi n_2/cn_o$, $n_o$ and $n_2$ are the linear and nonlinear refractive indices, respectively and c is the speed of light. At an intensity above approximately $10^9$ W/cm$^2$ in the laser material, the accumulated nonlinear phase can result in amplitude modulation of the laser pulse resulting in the possibility of damage to the laser system. Pulse stretching avoids this problem by reducing the peak power in the laser amplifier. Stretching is achieved by passage of the pulse through a dispersive optical device. A dispersive optical device is one in which the time required to traverse the device is a function of the frequency of the light. This is most commonly achieved by devices in which the optical path length is a function of frequency. Examples include propagation through a fiber where the variation in optical path length with frequency is given by the frequency dependence of the refractive index, $n(\omega)$, i.e., $L_{opt}=n(\omega)L_{fiber}$. For example, propagation through a pure fused silica fiber generates a dispersion of approximately 100 ps/km per nm of bandwidth for lasers operating near 0.8 micron wavelength, (e.g., an initially 100 femtosecond pulse with a 10 nm bandwidth will broaden by a factor of 1000 to 100 picoseconds by propagating through 100 meters of fused silica fiber).

Much higher dispersion can be achieved with pulse stretchers employing a diffraction grating. In such a device, the different frequency components of the laser pulse travel physically different paths determined by the angular dispersion of the grating, $m\lambda=\sin(\theta_{in})+\sin(\theta_{out})$ where $\lambda$ is the wavelength of the laser light, $\theta_{in}$ and $\theta_{out}$ are the input and output angles from the diffraction grating, respectively. In the present system a device employing a 1800 l/mm diffraction grating, a 1 meter focal length concave spherical mirror and a pair of retro-reflecting roof mirrors stretches the pulse from 100 fsec to approximately 500 psec, a stretching ratio of $\approx$5000 (see M. D. Perry, et al, U.S. patent application Ser. No. 08/869,345, titled "Aberration-Free, All-Reflective Stretcher For Chirped-Pulse Amplification" incorporated herein by reference.

The stretched pulse is amplified by several orders of magnitude to the millijoule level in the next stage. Although many types of laser amplifiers could be used here, the preferred embodiment is a regenerative amplifier 14. This is a device where the pulse can make multiple passes through a single amplifier media. The regenerative amplifier used in the present system utilized Titanium-doped sapphire as the gain medium. However, any laser material with sufficient bandwidth to support the bandwidth of the short pulse may be used. Specifically, Chromium-doped LiSrAlF$_6$ (and related compounds, e.g., Cr:LiSrGaAlF), Neodymium(Nd)-doped glass, Neodymium-doped yttrium lithium fluoride and Neodymium and ytterbium(Yb)-doped-yttrium aluminum garnet (YAG) and Yb-doped glass have been used.

In the current embodiment, a second laser is used to pump the Ti:Sapphire gain medium due to the short upper-state lifetime of Ti:Sapphire. Both a frequency-doubled, Q-switched Neodymium-yttrium-lithium-fluoride (Nd:YLF) laser or a Nd:YAG laser have been used as the pump laser. The energy required to pump the Ti:sapphire regenerative amplifier is typically greater than four times the energy output of the regenerative amplifier. The repetition rate of this system is determined by the repetition rate of the pump laser. Switching of the pulse into and out of the regenerative amplifier is accomplished with pulse switching technology based on the Pockels or acousto-optics effects. The regenerative amplifier produces pulses up to 10 mJ in energy.

Note that if laser materials which exhibit a longer upper state lifetime than Ti:sapphire are used as the gain medium, then a second pump laser is not required. Specific examples are neodymium-doped yttrium lithium fluoride, Nd:YAG, Nd:glass, Cr:LiSrAlF$_6$, Yb:YAG, etc. These materials can be directly pumped by laser diodes, thereby eliminating the need for a separate pump laser.

Figure 4:
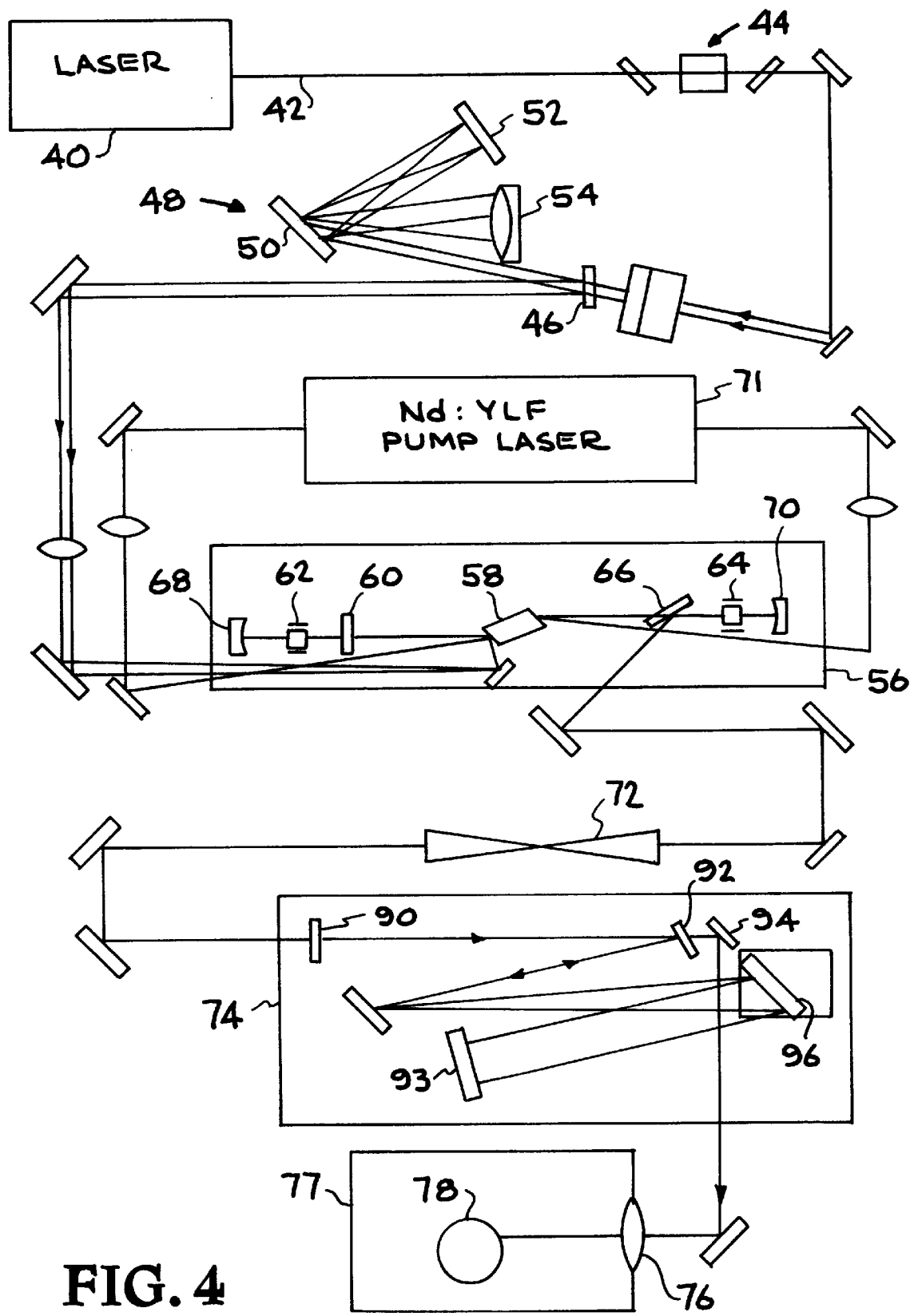
FIG. 4 is a schematic of an exemplary laser system used to machine explosives according to the process of the present invention.

Following amplification, the pulse is compressed by a variable length pulse compressor 16 employing a diffraction grating. A single grating pulse compressor as described in the incorporated application can be used, or a double-grating compressor, as shown in FIG. 4 may be used. (Prior to pulse compression however, a power amplifier 15 may be used if increased cutting speed is desired.) A final pulse duration has been demonstrated which can typically be adjusted between 20 femtoseconds and 100 picoseconds. The pulse energy exiting the grating compressor is reduced by approximately 30 percent from that exiting the regenerative amplifier as a result of the finite diffraction efficiency of the grating. The method of producing high peak power ultrashort pulses where the initial short pulse is stretched prior to amplification, amplified and then recompressed is known to those skilled in the art as chirped-pulse amplification. (See M. D. Perry and G. Mourou, "Terawatt to Petawatt Subpicosecond Lasers," *Science*, 264, 917 (1994), and references therein.)

The laser pulse is directed to the focusing system by either an open beam transport system, an articulated arm, an optical fiber or hollow core waveguide, all generically referred to herein as beam delivery system 18. The delivery system 18 may be designed to provide additional compression of the pulse duration. The beam transport may be comprised of standard relay telescopes which are well known in the art. The focusing system 22 is comprised of either a simple or compound lens or concave mirror arrangement for focusing the pulse onto the target material with the desired spot size. Central to the present invention is that the focusing conditions must achieve the threshold irradiance to initiate plasma formation. Typical values are approximately $10^{13}$ to $10^{14}$cm$^2$ for 100 fsec pulses. The laser beam then passes through a laser window 23 into an atmosphere controlled chamber 26 and onto a target 24 which comprises an explosive material. Once a critical density plasma is achieved on the sample, further energy deposition from the laser is minimal. The cut depth saturates at approximately 0.5 microns per pulse. In the saturated regime and beyond, any further increase in laser irradiance goes towards increasing the temperature of the plasma with little effect on the cut rate for thin samples. The spot size is easily adjusted either by moving the target away from best focus or by changing the focusing element. All of these focusing techniques are well known to those skilled in the art. The spatial distribution of laser radiation on the target may be tailored by using phase imaging optics. Specifically, the use of phase plates placed either before or after the focusing element to produce a particular beam shape on the target is part of the invention.

Figure 5A:
FIG. 5A is a drawing of a cut in the explosive material PETN where the cut was made with a conventional laser.
Figure 5B:
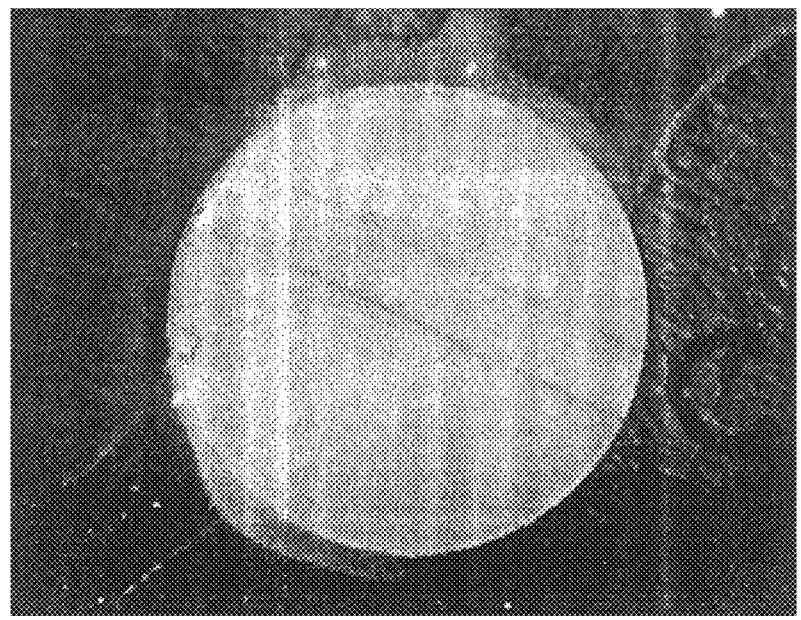
FIG. 5B shows a drawing of a PETN explosive cut with the present invention.

Referring to the exemplary laser system of FIG. 4, a mode-locked laser oscillator 40 produces 100 fsec pulses at 825 nm having an average power of less than 1 Watt at 76 MHz and traveling on beam path 42. Faraday isolator 44 prevents amplified light from reaching oscillator 40. The pulses traveling on beam path 42 pass through pick-off mirror 46 and into pulse stretcher 48, which consists of an 1800 l/mm grating 50, a flat mirror 52 (in the Fourier plane) and a spherical mirror 54 (e.g., a parabolic mirror). The pulses exiting the pulse stretcher 48 are focused into regenerative amplifier 56, which consists of a Ti:Sapphire medium 58, 20 Watts and 527 nm. Firing of the first Pockels cell to quarter-wave voltage (≈3500 V) combined with the combined with the second Pockels cell to quarter-wave voltage. A double-pass through this Pockels cell rotates the beam polarization by 90 degrees whereupon the pulse is then directed out of the cavity by the thin film polarizer. Following the regenerative amplifier, the pulse is directed to a single or double grating compressor 74 by standard beam transport optics 72. The double-grating compressor 74 comprises a half wave plate 90, beamsplitter 92, roof mirror 93, pick-off mirror 94, a 2 inch diameter 1800 lines/mm grating 96 and a 4 inch diameter, 1800 lines/mm grating 98 on a translation stage 100. It is then focused with an achromatic lens 76 having a 30 cm focal length into a controlled atmosphere chamber 77 and onto a workpiece 78. The irradiance at the workpiece for this system will exceed $10^{13}$ W/cm$^2$. FIG. 5A shows a photograph of a cut in the explosive material PETN where the cut was made with a conventional laser. FIG. 5B shows a photograph of a PETN explosive cut with the present invention.

When cutting thick material at high aspect ratio (thin kerf in thick material, e.g., 50 μm kerf in 2 mm thick material), an irradiance beyond the saturation level is often required to achieve sufficiently high plasma temperature to prevent redeposition of the material. This is due to two factors. First, in high aspect ratio cutting, the kerf itself may function as a waveguide. This both reshapes the spatial distribution of the laser light and reduces the intensity reaching the bottom of the kerf. As a result, the fluence incident on the bottom of the kerf may be substantially less than that incident on the part surface. Second, as the plasma expands from the surface, it cools. The irradiance must be high enough at the bottom of the kerf to insure a high enough temperature such that when the plasma expands and cools, it cannot cool to the point where it can condense on the walls of the kerf as it exits. This high irradiance can be achieved either by shortening the pulse duration at a fixed fluence or by increasing the fluence for a fixed pulse duration.

Any laser wavelength from 0.25 to over 10 microns can be used in the present invention. The laser used in the reduction to practice can produce continuously tunable output from approximately 0.78 microns to over 1 micron by a simple change of optics and minor adjustments to the angles of the gratings in the pulse stretcher and compressor. In order to optimize the cutting efficiency for particular explosives, the system can be operated in the 400 to 500 nm range by conversion to the second harmonic. Operation at the second harmonic (400 to 500 nm) is accomplished by passing the beam through a thin nonlinear crystal (e.g., potassium di-hydrogen phosphate (KDP), Lithium Borate, , β-Barium borate, etc.) after compression. The crystal can be cut for either type I or type II phase matching and is typically between 0.1 and 4 millimeters in length.

Changes and modifications in the specifically described embodiments can be carried out without departing from the scope of the invention, which is intended to be limited by the scope of the appended claims.

What is claimed is:

1. A method for machining explosive materials, comprising:

producing a pulsed laser output beam comprising a plurality of laser pulses wherein each pulse of said plurality of laser pulses has a pulse repetition rate greater than 1 Hz, wherein each said pulse has a pulse duration of 50 picosecond or less; and directing said pulsed laser output beam onto a workpiece comprising explosive material, wherein each said pulse converts approximately 0.01 to 1 micron of said explosive material of said workpiece from the solid state to the plasma state with substantially no transfer of thermal or mechanical energy into the remaining material and substantially no collateral damage thereto, wherein said explosive material is removed from said workpiece by hydrodynamic expansion of said plasma, wherein said plasma consists of inert gases and no toxic vapor, wherein said method does not induce detonation or deflagration of said explosive material.

2. A method for machining explosive material, comprising:

directing a laser beam onto a workpiece comprising explosive material, wherein said laser beam comprises a plurality of laser pulses, wherein each pulse of said plurality of laser pulses has a pulse repetition rate greater than 1 Hz, wherein each said pulse has a pulse duration within the range of 5 femtoseconds to 100 picoseconds and a focused irradiance of greater than $10^{12}$ W/cm$^2$, wherein each pulse of said plurality of laser pulses converts approximately 0.01 to 1 micron of said explosive material of said workpiece from the solid state to the plasma state with substantially no transfer of thermal or mechanical energy into the remaining material and substantially no collateral damage thereto, wherein said material is removed from said workpiece by hydrodynamic expansion of said plasma, wherein said plasma consists of inert gases and no toxic vapor, wherein said laser beam produces no detonation or deflagration of said explosive material.

3. The method of claim 2, wherein said plurality of laser pulses removes said explosive material from said workpiece with no modification of or damage to the structure of remaining explosive material of said workpiece beyond approximately 1 micron from the kerf.

4. The method of claim 2, wherein said plurality of laser pulses removes said explosive material with no modification of or damage to the structure of remaining explosive material of said workpiece beyond a depth within a range of approximately 0.1–1 micron (depending upon the particular material).

5. The method of claim 2, wherein said pulse duration is adjusted such that the thermal penetration depth $L_{th}$ during the pulse (which is equal to $2\sqrt{\alpha\tau}$ ($\alpha = k/\rho c_p$ is the thermal diffusivity, k is the thermal conductivity, $\rho$ is the density, $c_p$ is the heat capacity and $\tau$ is the duration of the laser pulse)) is less than one micron.

6. The method of claim 2, wherein the electric field of each said pulse penetrates more deeply into said explosive material than the thermal wave produced in said explosive material during each said pulse.

7. The method of claim 2, wherein said plurality of laser pulses removes said explosive material from said workpiece with no modification of or damage to the structure of remaining explosive material of said workpiece beyond approximately 1 micron from the kerf, wherein external cooling of said workpiece is unnecessary.

8. The method of claim 2, wherein even though only a very small depth of material is removed per pulse, the high repetition rate enables extremely high cut rates (beyond 1 mm depth per second).

9. The method of claim 5, wherein each said pulse converts said explosive material from the solid-state to the plasma state so quickly that there is insufficient time for significant heat transfer beyond the depth removed from said workpiece, wherein as each said pulse encounters the solid surface of said explosive material for the duration of said pulse, energy is deposited into said explosive material to raise a depth thereof to a temperature far beyond its boiling point (typically to temperatures above the ionization point), wherein after said pulse is over, said depth leaves the surface of said workpiece with an expansion velocity determined by the initial temperature.

* * * * *